(12) United States Patent
Lima

(10) Patent No.: US 8,534,930 B1
(45) Date of Patent: Sep. 17, 2013

(54) CIRCUIT BOARDS DEFINING OPENINGS FOR COOLING ELECTRONIC DEVICES

(75) Inventor: David J. Lima, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 582 days.

(21) Appl. No.: 12/566,425

(22) Filed: Sep. 24, 2009

(51) Int. Cl.
*G02B 6/36* (2006.01)

(52) U.S. Cl.
USPC ............ 385/92; 385/14; 385/15; 385/39; 385/88

(58) Field of Classification Search
USPC .................... 385/14, 15, 39, 88, 92
See application file for complete search history.

(56) References Cited

U.S. PATENT DOCUMENTS

| | | | | |
|---|---|---|---|---|
| 4,133,022 | A | * | 1/1979 | Moore et al. ............ 361/801 |
| 5,077,638 | A | | 12/1991 | Andersson et al. |
| 5,477,416 | A | | 12/1995 | Schkrohowsky et al. |
| 5,912,801 | A | | 6/1999 | Roy et al. |
| 5,973,923 | A | | 10/1999 | Jitaru |
| 6,002,587 | A | | 12/1999 | Shusa et al. |
| 6,002,588 | A | | 12/1999 | Vos et al. |
| 6,094,349 | A | | 7/2000 | Fassel et al. |
| 6,163,454 | A | | 12/2000 | Strickler |
| 6,198,630 | B1 | | 3/2001 | Cromwell |
| 6,312,287 | B1 | * | 11/2001 | Harting et al. ........... 439/581 |
| 6,330,745 | B1 | | 12/2001 | Cromwell et al. |
| 6,449,150 | B1 | | 9/2002 | Boone |
| 6,452,797 | B1 | | 9/2002 | Konstad |
| 6,545,879 | B1 | | 4/2003 | Goodwin |
| 6,600,611 | B2 | | 7/2003 | Inujima et al. |
| 6,729,905 | B1 | | 5/2004 | Hwang |
| 6,768,640 | B2 | | 7/2004 | Doblar et al. |
| 6,778,386 | B2 | | 8/2004 | Garnett et al. |
| 6,816,376 | B2 | | 11/2004 | Bright et al. |
| 6,860,649 | B2 | * | 3/2005 | Edwards et al. ............ 385/92 |
| 6,893,293 | B2 | | 5/2005 | Ice et al. |
| 6,912,131 | B2 | | 6/2005 | Kabat |
| 6,916,122 | B2 | | 7/2005 | Branch et al. |
| 6,922,516 | B2 | | 7/2005 | Kurashima et al. |
| 6,935,882 | B2 | | 8/2005 | Hanley et al. |
| 6,940,723 | B2 | | 9/2005 | Ice et al. |
| 6,980,437 | B2 | | 12/2005 | Bright |
| 6,986,679 | B1 | | 1/2006 | Aronson et al. |
| 7,048,452 | B2 | | 5/2006 | Malagrino, Jr. |
| 7,057,895 | B2 | | 6/2006 | Mejia et al. |

(Continued)

FOREIGN PATENT DOCUMENTS

JP       2010085805 A    4/2010
WO    WO 03/060583 A1  7/2003

OTHER PUBLICATIONS

Office Action mailed Dec. 9, 2011 for U.S. Appl. No. 12/616,497.

*Primary Examiner* — Jennifer Doan
(74) *Attorney, Agent, or Firm* — Cooley LLP

(57) ABSTRACT

Printed circuit boards and assemblies for cooling electronic devices in processing units are described herein. In some embodiments, a printed circuit board configured to be coupled to an electronic device defines a first set of lumens configured to receive a mounting portion of a frame. The frame and a portion of a first surface of the printed circuit board collectively define an internal volume within which at least a portion of the electronic device can be disposed and an external volume that is external to the internal volume. The printed circuit board defines a second set of lumens positioned to place at least a portion of the external volume in fluid communication with the internal volume.

17 Claims, 9 Drawing Sheets

(56) References Cited

U.S. PATENT DOCUMENTS

| | | |
|---|---|---|
| 7,074,123 B2 | 7/2006 | Bettridge |
| 7,112,131 B2 | 9/2006 | Rasmussen et al. |
| 7,154,748 B2 | 12/2006 | Yamada |
| 7,158,379 B2 | 1/2007 | Sanders et al. |
| 7,164,581 B2 | 1/2007 | Carullo et al. |
| 7,178,996 B2 | 2/2007 | Malagrino |
| 7,195,403 B2 | 3/2007 | Oki et al. |
| 7,209,351 B2 | 4/2007 | Wei |
| 7,224,582 B1 | 5/2007 | Saturley et al. |
| 7,248,479 B2 | 7/2007 | Summers et al. |
| 7,256,995 B2 | 8/2007 | Wrycraft et al. |
| 7,317,617 B2 | 1/2008 | Meadowcroft et al. |
| 7,322,850 B2 | 1/2008 | Neer et al. |
| 7,491,090 B2 | 2/2009 | Oki et al. |
| 7,511,947 B2 | 3/2009 | Leng et al. |
| 7,530,835 B2 | 5/2009 | Yu et al. |
| 7,722,359 B1 | 5/2010 | Frangioso et al. |
| 7,804,684 B1 | 9/2010 | Aybay et al. |
| 7,808,792 B2 | 10/2010 | Nguyen |
| 7,813,120 B2 | 10/2010 | Vinson et al. |
| 7,826,222 B2 | 11/2010 | Aybay et al. |
| 7,885,066 B2 | 2/2011 | Boyden et al. |
| 7,898,808 B2 | 3/2011 | Joiner et al. |
| 7,916,472 B1 | 3/2011 | Aybay et al. |
| 7,974,098 B2 | 7/2011 | Oki et al. |
| 8,120,912 B2 | 2/2012 | Aybay et al. |
| 8,125,779 B2 | 2/2012 | Aybay et al. |
| 8,223,498 B2 | 7/2012 | Lima |
| 8,238,094 B1 | 8/2012 | Aybay et al. |
| 8,279,601 B2 | 10/2012 | Lima et al. |
| 2002/0018339 A1 | 2/2002 | Uzuka et al. |
| 2002/0126449 A1 | 9/2002 | Casebolt |
| 2003/0002824 A1 | 1/2003 | Chan et al. |
| 2003/0141090 A1 | 7/2003 | Kruger et al. |
| 2003/0161108 A1 | 8/2003 | Bright et al. |
| 2003/0169983 A1 | 9/2003 | Branch et al. |
| 2003/0236019 A1 | 12/2003 | Hanley |
| 2004/0001311 A1 | 1/2004 | Doblar et al. |
| 2004/0101257 A1 | 5/2004 | Kruger et al. |
| 2004/0130868 A1 | 7/2004 | Schwartz et al. |
| 2004/0203289 A1 | 10/2004 | Ice et al. |
| 2004/0264145 A1 | 12/2004 | Miller et al. |
| 2005/0207134 A1 | 9/2005 | Belady et al. |
| 2005/0220425 A1 | 10/2005 | Kropp et al. |
| 2005/0226571 A1 | 10/2005 | Malagrino, Jr. et al. |
| 2005/0281005 A1 | 12/2005 | Carullo et al. |
| 2006/0002084 A1 | 1/2006 | Wei |
| 2006/0126292 A1 | 6/2006 | Pfahnl et al. |
| 2006/0270275 A1 | 11/2006 | Morohashi et al. |
| 2006/0274518 A1 | 12/2006 | Yu et al. |
| 2007/0134003 A1 | 6/2007 | Lee et al. |
| 2007/0223199 A1 | 9/2007 | Fujiya et al. |
| 2008/0031620 A1 | 2/2008 | Hudgins et al. |
| 2008/0232067 A1 | 9/2008 | Joiner et al. |
| 2008/0247762 A1 | 10/2008 | Yoshikawa et al. |
| 2009/0059520 A1 | 3/2009 | Tanaka et al. |
| 2009/0116185 A1 | 5/2009 | Su et al. |
| 2009/0296352 A1 | 12/2009 | Lima |
| 2010/0014248 A1 | 1/2010 | Boyden et al. |
| 2011/0011562 A1 | 1/2011 | Aybay et al. |
| 2011/0011567 A1 | 1/2011 | Aybay et al. |
| 2011/0056660 A1 | 3/2011 | Aybay et al. |
| 2011/0110048 A1 | 5/2011 | Lima |
| 2011/0182027 A1 | 7/2011 | Lima |

* cited by examiner

CIRCUIT BOARDS DEFINING OPENINGS FOR COOLING ELECTRONIC DEVICES

BACKGROUND

This invention relates to apparatus and methods for cooling electronic devices, such as, for example, circuit boards defining openings for cooling electronic devices.

Some known electronic devices are manufactured according to industry standards that specify the size, shape, form factor and/or electronic performance of the electronic device. The use of such standards allows similar electronic devices produced by different manufacturers to be used interchangeably within a data processing unit (e.g., a router, a switch, a server and/or the like). Because the size, shape and/or form factor of such known electronic devices are dictated by such industry standards, in certain instances limited flexibility exists to change the design of electronic device to improve heat dissipation, increase power levels or the like. Accordingly, some known data processing units include heat sinks and/or other mechanisms to improve the overall performance (e.g., thermal performance) of such electronic devices.

For example, some known optical transceivers are manufactured according to an industry standard known as the Small Form-factor Pluggable (SFP) standard. Optical transceivers manufactured according to the SFP standard are configured to be "pluggable" such that the optical transceiver can be inserted and/or removed from the host data processing unit without removing power from the unit. Some such optical transceivers are installed inside of the host data processing unit within a protective cage or enclosure. Such known cage-mounted arrangements can include a heat sink and/or other mechanisms to dissipate heat from the top surface of the optical transceiver. Such arrangements, however, do not provide any mechanism for promoting heat transfer from the bottom surface of the optical transceiver.

Thus, a need exists for improved apparatus and methods for apparatus and methods for cooling electronic devices.

SUMMARY

Printed circuit boards and assemblies for cooling electronic devices in processing units are described herein. In some embodiments, a printed circuit board configured to be coupled to an electronic device defines a first set of lumens configured to receive a mounting portion of a frame. The frame and a portion of a first surface of the printed circuit board collectively define an internal volume within which at least a portion of the electronic device can be disposed and an external volume that is external to the internal volume. The printed circuit board defines a second set of lumens positioned to place at least a portion of the external volume in fluid communication with the internal volume.

DETAILED DESCRIPTION

Figure 1:
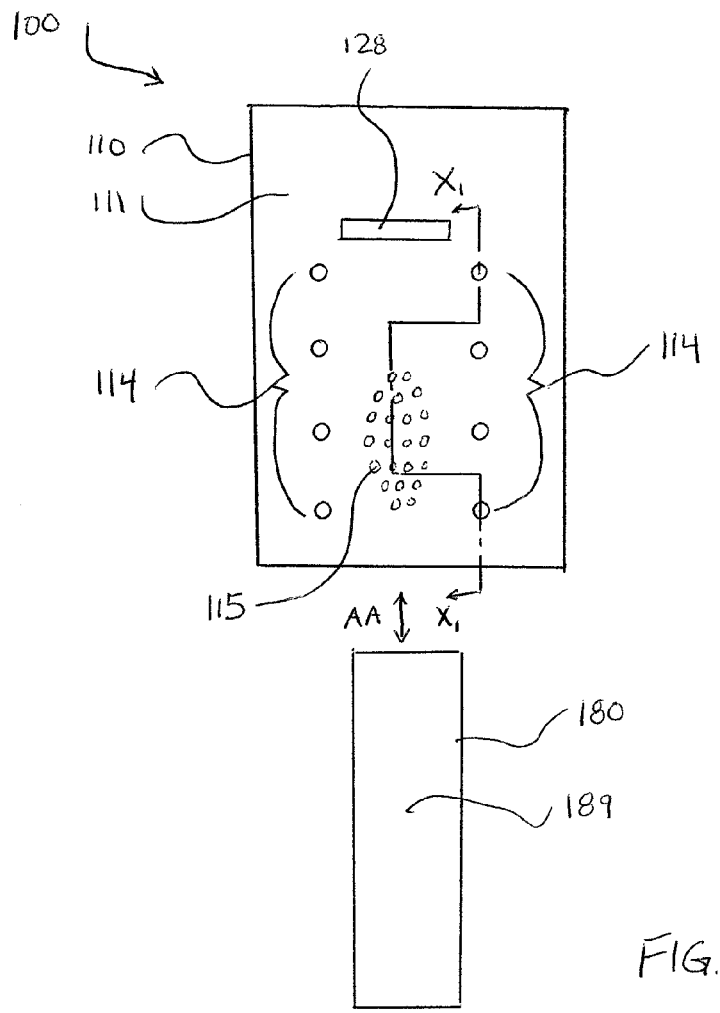
FIG. 1 is a top view schematic illustration of a portion of a data processing unit according to an embodiment.

Printed circuit boards and assemblies for cooling electronic devices in processing units are described herein. In some embodiments, a printed circuit board configured to be coupled to an electronic device defines a first set of lumens configured to receive a mounting portion of a frame. The frame and a portion of a first surface of the printed circuit board collectively define an internal volume within which at least a portion of the electronic device can be disposed and an external volume that is external to the internal volume. The printed circuit board defines a second set of lumens positioned to place at least a portion of the external volume in fluid communication with the internal volume.

In some embodiments, a data processing unit includes a printed circuit board and a frame. The printed circuit board is configured to be coupled to an electronic device, such as, for example, a pluggable optical transceiver. The printed circuit board defines a set of mounting lumens and a set of flow lumens between a first surface and a second surface opposite the first surface. The frame defines an internal volume within which at least a portion of the electronic device is disposed when the electronic device is coupled to the printed circuit board. The frame includes a set of mounting protrusions and a side wall. The frame is coupled to the printed circuit board such that each mounting protrusion from the set of mounting protrusions is disposed within a mounting lumen from the set of mounting lumens, and a portion of side wall is adjacent the first surface of the printed circuit board. The portion of the side wall defines a set of frame openings. At least one frame opening from the set of frame openings is at least partially overlapped with at least one respective lumen from the set of flow lumens defined by the printed circuit board such that an external volume adjacent the second surface of the printed circuit board is in fluid communication with the internal volume.

In some embodiments, a data processing unit includes a printed circuit board and a flow member. The printed circuit board is configured to be coupled to an electronic device, such as, for example, a pluggable optical transceiver. The printed circuit board defines a first set of lumens therethrough configured to receive a mounting portion of a frame such that the frame and a first side of the printed circuit board define, at least in part, an internal volume within which at least a portion of the electronic device can be disposed. The printed circuit board defines a second set of lumens that place an external volume adjacent a second surface of the printed circuit board and external to the internal volume in fluid communication with the internal volume. The flow member is coupled to the second surface of the printed circuit board. The flow member and a portion of the second surface collectively define a flow path into at least one lumen from the second plurality of lumens.

As used herein the term "data processing unit" refers to, for example, any computer, electronic switch, switch fabric, portion of a switch fabric, router, host device, data storage device, line card or the like used to process, transmit and/or convey electrical and/or optical signals. A data processing unit can include, for example, a component included within an electronic communications network. In some embodiments, for example, a data processing unit can be a component included within or forming a portion of a core switch fabric of a data center. In other embodiments, a data processing unit can be an access switch located at an edge of a data center, or a host or peripheral device (e.g., a server) coupled to the access device. For example, an access switch can be located on top of a chassis containing several host devices.

As used herein the term "electronic device" refers to any component within a data processing unit that is configured to perform an electronic function associated with the data processing unit. An electronic device can include, for example, a switching device, a converter, a receiver, a transmitter, a signal conditioner, an amplifier or the like. In some embodiments, an electronic device can include an optical transceiver configured to convert electrical signals into optical signals and vice versa.

Figure 2:
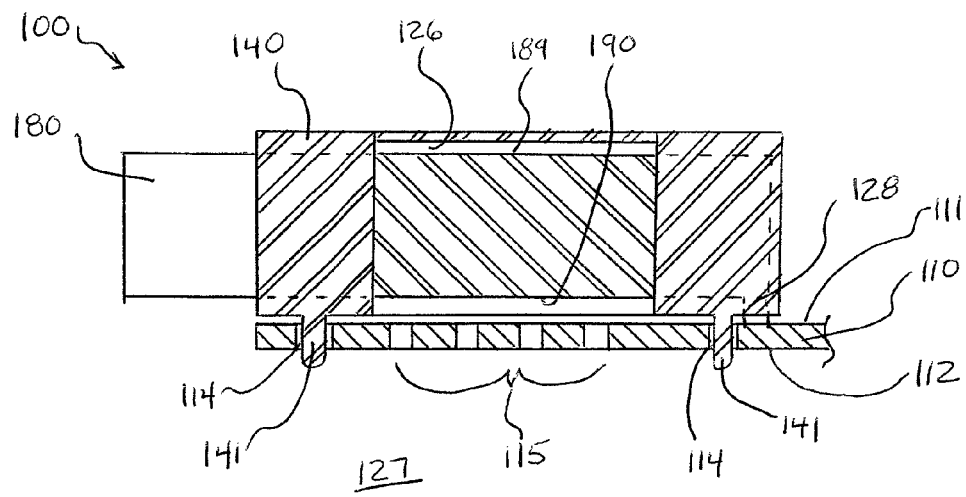
FIG. 2 is a cross-sectional view of the portion of the data processing unit shown in FIG. 1 taken along line $X_1$-$X_1$ in FIG. 1.

FIG. 1 is a top view schematic illustration of a portion of a data processing unit 100 according to an embodiment. FIG. 2 is a cross-sectional view of the portion of a data processing unit 100 taken along line $X_1$-$X_1$ in FIG. 1. The data processing unit 100 includes a printed circuit board 110, an electronic device 180 and a frame 140. The frame 140 is not shown in FIG. 1 for purposes of clarity. The printed circuit board 110 includes a first (or top) surface 111 and a second (or bottom) surface 112 (shown in FIG. 2). The printed circuit board 110 defines a first set of lumens 114 and a second set of lumens 115. The printed circuit board 110 also includes electronic circuitry (e.g., modules, connectors, and the like, which are not shown in FIGS. 1 and 2) configured to perform, at least in part, the functions of the data processing unit 100. The first surface 111 of the printed circuit board 110 includes an electrical connector 128 that can electronically couple the electronic device 180 to the printed circuit board 110 and/or the electronic circuitry of the printed circuit board 110.

The electronic device 180, which can be, for example, a pluggable optical transceiver, includes a first (or top) surface 189 and a second (or bottom) surface 190. The electronic device 180 can be inserted into and/or removed from the data processing unit 100 as shown by the arrow AA in FIG. 1. Similarly stated, the electronic device 180 can be coupled to the printed circuit board 110 by moving the electronic device 180 relative to the printed circuit board 110 until the electronic device 180 is electrically coupled to the connector 128.

As shown in FIG. 2, the frame 140 is coupled to the printed circuit board 110 to enclose and/or contain the electronic device 180 when the electronic device 180 is coupled to the printed circuit board 110. The frame 140 can be, for example, a cage to enhance the electromagnetic interference (EMI) shielding, thermal performance and/or overall reliability of the data processing unit 100 and/or the electronic device 180. More particularly, the frame 140 and a portion of the first surface 111 of the printed circuit board 110 define an internal volume 126 within which at least a portion of the electronic device 180 can be disposed when the electronic device 180 is coupled to the printed circuit board 110. Similarly stated, the frame 140 and a portion of the first surface 111 of the printed circuit board 110 define an internal volume 126 and an external volume 127 that is outside of the internal volume.

Although the frame 140 and the portion of the first surface 111 of the printed circuit board 110 are shown as substantially surrounding a portion of the electronic device 180, in other embodiments, the frame 140 can include openings (or "cut-outs"). Although the frame 140 and the portion of the first surface 111 of the printed circuit board 110 are shown as defining the internal volume 126 that receives only a portion of the electronic device 180, in other embodiments, the internal volume 126 can receive the entire electronic device 180. For example, in some embodiments, a length of the frame 140 can be greater than or equal to a length of the electronic device 180.

As shown in FIG. 2, the frame 140 is coupled to the printed circuit board 110 by a mounting portion, which includes a set of mounting protrusions 141. More particularly, when the frame 140 is coupled to the printed circuit board 110, each of the mounting protrusions 141 is disposed within a corresponding lumen 114 from the first set of lumens 114 such that the first set of lumens 114 and the set of mounting protrusions 141 collectively limit the movement of the frame 140 relative to the printed circuit board 110. In some embodiments, for example, the mounting protrusions 141 can be sized to produce an interference fit within the corresponding lumens 114. In other embodiments, the mounting protrusions 141 can be deformed, bent and/or locked within the corresponding lumen 114 to fixedly couple the frame 140 to the printed circuit board 110. In yet other embodiments, the mounting protrusions 141 can be coupled within the corresponding lumen 114 via an adhesive, melt bond or the like.

When the frame 140 is coupled to the printed circuit board 110, the second set of lumens 115 places at least a portion of the external volume 127 in fluid communication with the internal volume 126. More particularly, as shown in FIG. 2, the second set of lumens 115 extend through the printed circuit board 110 from the second surface 112 to the first surface 111, thereby providing fluid communication between the internal volume 126 and the external volume 127 adjacent the second surface 112. In this manner, air can flow from the bottom side 112 of the printed circuit board 110 (i.e., the external volume 127 adjacent the second surface 112) into the internal volume 126 via the second set of lumens 115. This arrangement can improve the thermal performance of the data processing unit 100 by facilitating convective heat transfer from the second surface 190 of the electronic device 180 via the air flow through the second set of lumens 115.

Although the second set of lumens 115 is shown as defining a substantially oval-shaped pattern (from the top view shown in FIG. 1), the second set of lumens 115 can be in any location and/or can form any suitable shape. For example, in some embodiments, one or more lumens from the second set of lumens 115 can be positioned adjacent a predetermined portion of the second surface 190 of the electronic device 180 (e.g., a portion of the second surface 190 expected to operate at a higher temperature). Although the second set of lumens 115 is shown as being non-contiguous with the first set of lumens 114, in other embodiments, one or more lumens from the second set of lumens 115 can share a portion of a boundary with one or more of the lumens from the first set of lumens 114.

FIGS. 3-6 show a portion of a data processing unit 200 according to an embodiment. The data processing unit 200 includes a printed circuit board 210, an optical transceiver 280 and a mounting cage 240. The printed circuit board 210 includes a first (or top) surface 211 and a second (or bottom) surface 212 (shown in FIG. 5). The printed circuit board 210 defines a first set of lumens 214 that is used to couple the mounting cage 240 to the printed circuit board 210, as described in more detail below. The printed circuit board 210 defines a second set of lumens 215 through which air can flow to improve the thermal performance of the optical transceiver 280. The first set of lumens 214 and the second set of lumens 215 extend through the printed circuit board 210 from the first surface 211 to the second surface 212. Although the first set of lumens 214 is shown and described as extending through the printed circuit board 210, in other embodiment, at least one lumen from the first set of lumens 214 need not extend through the printed circuit board 210. Said another way, in some embodiments, at least one lumen from the first set of lumens 214 is a "blind" lumen.

The second set of lumens 215 can have any suitable cross-sectional shape and/or size. For example, in some embodiments, at least one lumen from the second set of lumens 215 can have a substantially circular cross-sectional shape across a plane substantially normal to the center line $C_L$ of the lumen. In other embodiments, at least one lumen from the second set of lumens 215 can have a substantially non-circular cross-sectional shape (e.g., rectangular, oval, triangular or the like) across a plane substantially normal to the center line $C_L$ of the lumen. In yet other embodiments, a first lumen from the second set of lumens 215 can have a first cross-sectional shape and a second lumen from the second set of lumens 215 can have a second cross-sectional shape different from the first cross-sectional shape.

Figure 3:
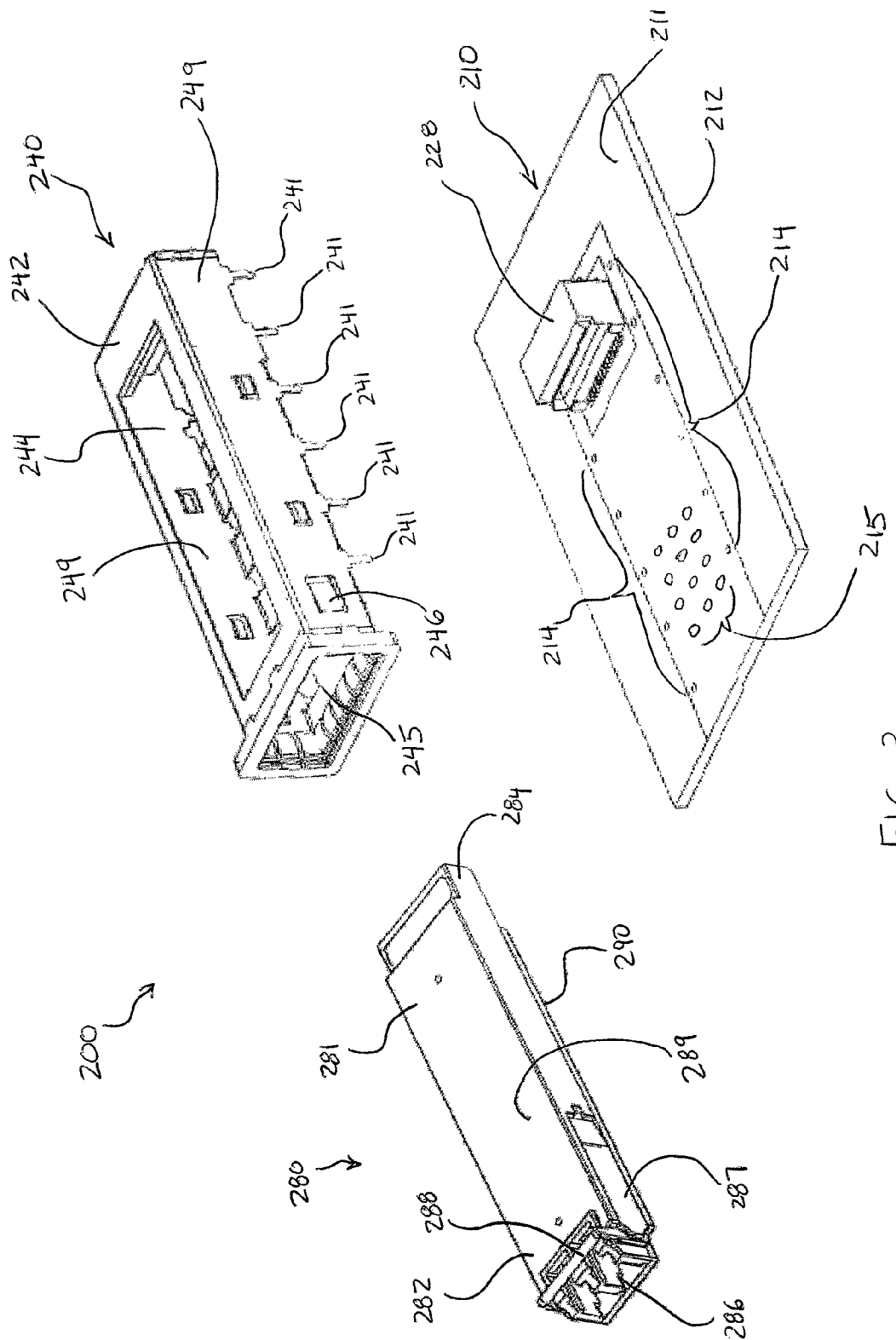
FIG. 3 is an exploded view of a portion of a data processing unit that includes a printed circuit board according to an embodiment.
Figure 4:
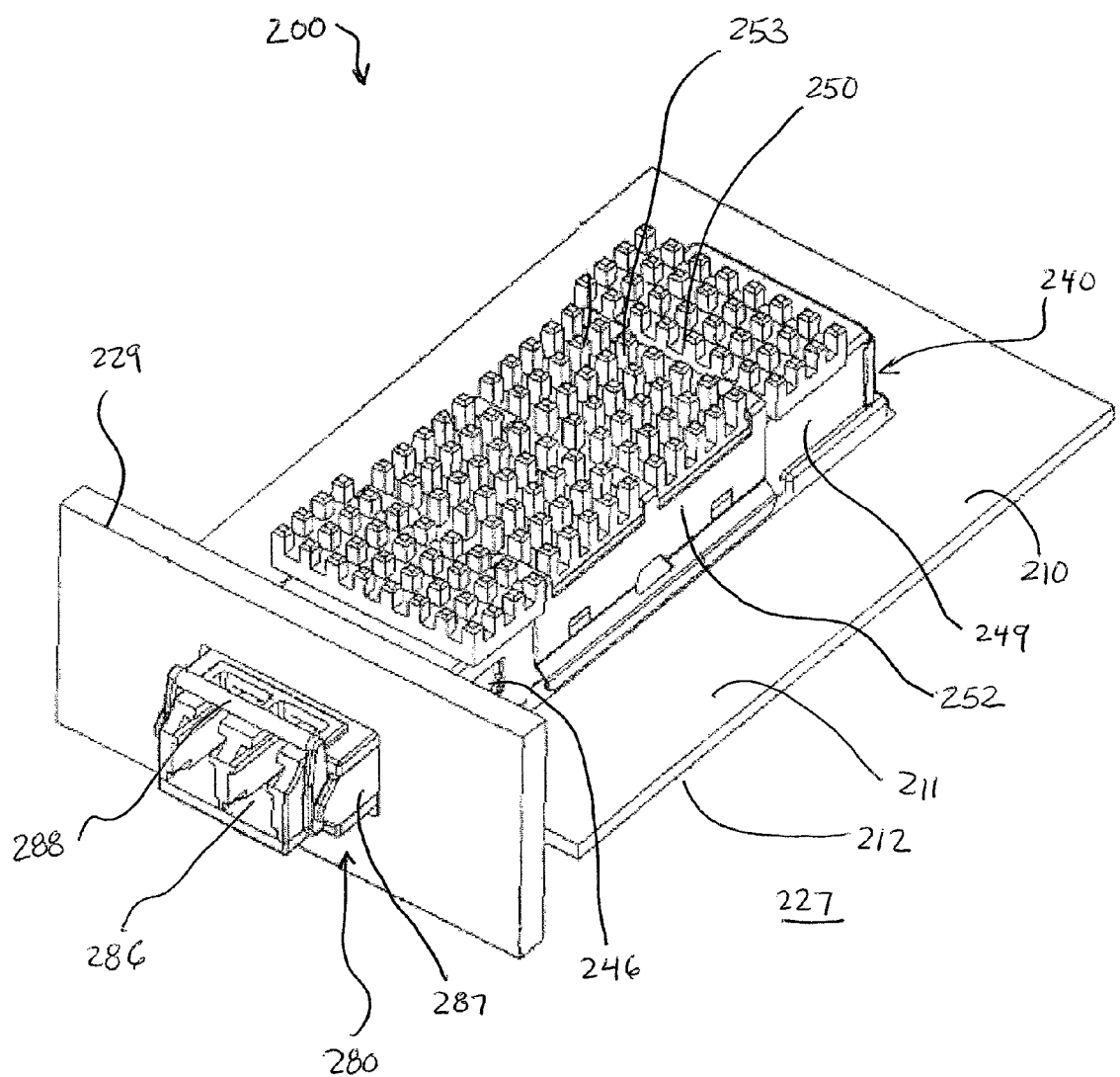
FIG. 4 is a perspective view of the portion of the data processing unit shown in FIG. 3.
Figure 5:
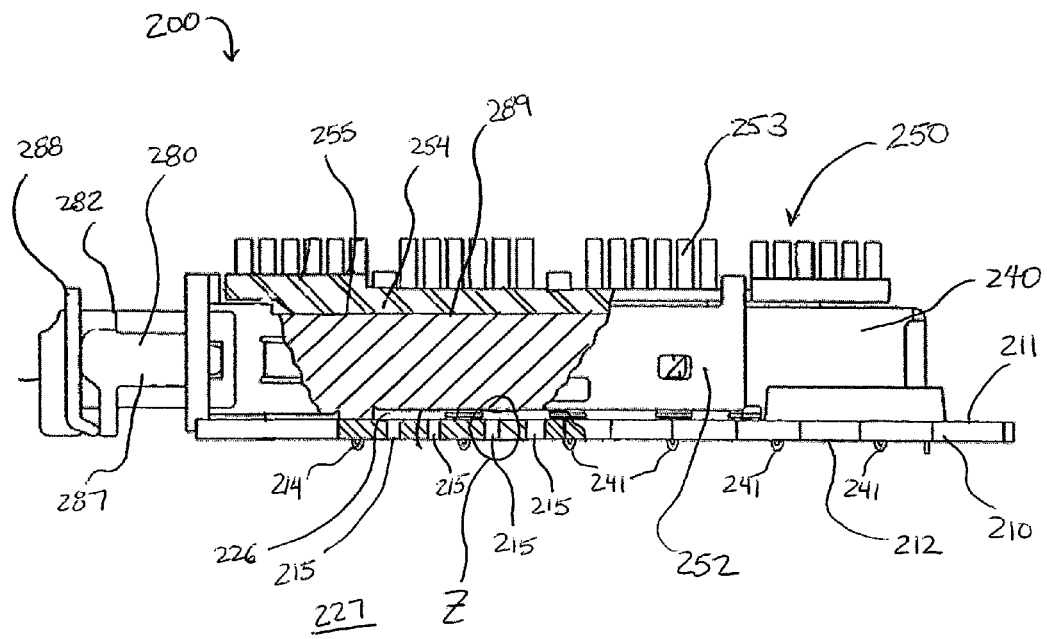
FIG. 5 is a side view and partial cross-sectional view of the portion of the data processing unit shown in FIG. 4.

The printed circuit board 210 also includes electronic circuitry (e.g., modules, connectors, and the like, which are not shown in FIGS. 3-5), in addition to the optical transceiver 280, that is configured to perform, at least in part, the functions of the data processing unit 200. The first surface 211 of the printed circuit board 210 includes an electrical connector 228 that can electronically couple the optical transceiver 280 to the printed circuit board 210 and/or the electronic circuitry of the printed circuit board 210.

The optical transceiver 280 can be any pluggable optical transceiver manufactured according to the SFP standard or any other Multi-Source Agreement (MSA) standard, including, for example, the Quad Small Form factor Pluggable (QSFP) standard, the CXP standard, the XFP standard, or the like. The optical transceiver 280 has a first end portion 281 and a second end portion 282. The first end portion 281, which is configured to be first inserted into the mounting cage 240, includes a connector 284 configured to matingly engage the electrical connector 228 of the printed circuit board 210. The second end portion 282 of the optical transceiver 280 includes an input/output connector 286, a locking mechanism 287 and an actuator 288 configured to actuate the locking mechanism 287. The locking mechanism 287 is configured to matingly engage a corresponding structure in the mounting cage 240 to selectively maintain the optical transceiver 280 within the mounting cage 240. The actuator 288 can actuate and/or release the locking mechanism 287 to facilitate insertion and/or removal of the optical transceiver 280 from the mounting cage 240.

The optical transceiver 280 includes a first (or top) surface 289 and a second (or bottom) surface 290. When the optical transceiver 280 is installed within the mounting cage 240, the first surface 289 is adjacent an opening 244 (i.e., a "top opening") defined by the mounting cage 240, and the second surface 290 is adjacent the first surface 211 of the printed circuit board 210. In this manner, when the optical transceiver 280 is installed within the mounting cage 240 a portion of a heat sink 250 can extend through the opening 244 of the mounting cage 240 to contact the first (or top) surface 289 of the optical transceiver 280 to facilitate heat transfer from the optical transceiver 280. Moreover, the second set of lumens 215 can provide a flow path through which air can flow adjacent the second (or bottom) surface 290 of the optical transceiver 280 to facilitate heat transfer from the optical transceiver 280.

The mounting cage 240 includes a first (or top) side wall 242 and two side portions 249. The side portions 249 include a series of mounting protrusions 241, each of which can be disposed within a corresponding lumen 214 from the first set of lumens 214 to couple the mounting cage 240 to the printed circuit board 210. Similarly stated, when the mounting cage 240 is coupled to the printed circuit board 210, the first set of lumens 214 and the set of mounting protrusions 241 collectively limit the movement of the mounting cage 240 relative to the printed circuit board 210. In some embodiments, for example, the mounting protrusions 241 can be sized to produce an interference fit within the corresponding lumen from the first set of lumens 214.

When the mounting cage 240 is coupled to the printed circuit board 210, the mounting cage 240 and a portion of the first surface 211 of the printed circuit board 210 define an internal volume 226 within which at least a portion of the optical transceiver 280 can be disposed. Similarly stated, the mounting cage 240 and a portion of the first surface 211 of the printed circuit board 210 define an internal volume 226 and an external volume 227 that is outside of the internal volume. More particularly, the internal volume 226 is the volume bounded by at least the portion of the first surface 211 of the printed circuit board 210, the first side wall 242 of the mounting cage 240 and the two side portions 249 of the mounting cage 240. The external volume 227 includes any volume external to the internal volume 226, including the volume outside of the internal volume 226 that is adjacent the second surface 212 of the printed circuit board 210, as identified in FIGS. 5 and 6. The external volume 227 also includes the volume outside of the internal volume 226 that is adjacent the first surface 211 of the printed circuit board 210 (e.g., the volume above the mounting cage 240).

Figure 6:
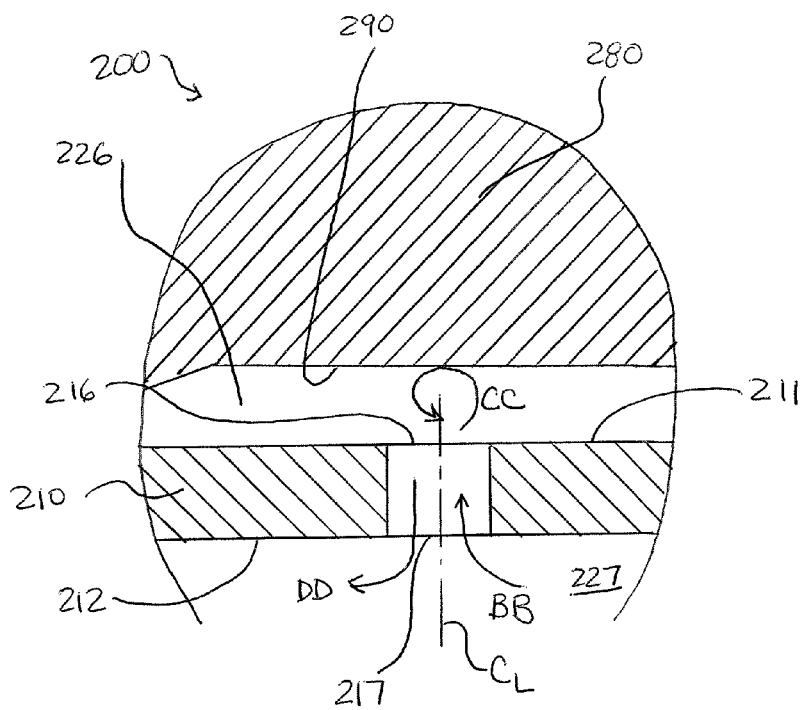
FIG. 6 is a portion of the printed circuit board and optical transceiver shown FIG. 5 taken along region Z in FIG. 5.

As shown in FIG. 6, the first surface 211 of the printed circuit board defines a first opening 216 in fluid communication with at least one lumen 215 from the second set of lumens 215, and the second surface 212 of the printed circuit board 210 defines a second opening 217 in fluid communication with the lumen 215. The lumen 215 extends between the first opening 216 and the second opening 217, and defines a center line $C_L$. In this manner, at least one lumen 215 from the second set of lumens 215 extends through the printed circuit board 210 between the second surface 212 and the first surface 211 to provide fluid communication between the internal volume 226 and the external volume 227 adjacent the second surface 212. Thus, in use, air (or any other suitable cooling fluid) can flow from the bottom side 212 of the printed circuit board 210 (i.e., the portion of the external volume 227 adjacent the second surface 212) into the internal volume 226 via the second set of lumens 215, as shown by the arrow BB in FIG. 6. The air can circulate within the internal volume 226 adjacent the second surface 290 of the optical transceiver 280, as shown by the arrow CC in FIG. 6, to produce convective transfer of heat from the second surface 290 of the optical transceiver 280. The air can then exit the lumen 215 (or any adjacent lumen from the second set of lumens 215) as shown by the arrow DD in FIG. 6.

As described above, the mounting cage 240 also facilitates heat transfer from the first (or top) surface 289 of the optical transceiver 280. More particularly, the first side wall 242 of the mounting cage 240 defines an opening 244 within which a portion of the heat sink 250 can be disposed. The heat sink 250 includes a convection portion 253 and an engagement portion 254. The convection portion 253 includes a series of protrusions or fins to provide an increased surface area to enhance the transfer of heat between the convection portion 253 and the cooling medium (e.g., air).

The engagement portion 254 is configured to be disposed within the opening 244 (see FIG. 5) to contact the first surface 289 of the optical transceiver 280. Moreover, a spring 252 is coupled to the mounting cage 240 and the heat sink 250 to urge the heat sink 250 downward relative to the mounting cage 240. Similarly stated, the spring 252 biases the heat sink 250 against the mounting cage 240 such that the engagement portion 254 of the heat sink 250 is at least partially disposed within the opening 244 of the mounting cage 240 to ensure that the contact surface 255 of the engagement portion 254 is in contact with the first surface 289 of the optical transceiver 280. In this manner, a conductive heat transfer path can be formed between the heat sink 250 and the optical transceiver 280. Thus, the heat sink 250 is a dynamically adjustable or "riding" heat sink that can accommodate the insertion and/or removal of the optical transceiver 280.

The mounting cage 240 also defines a front opening 245, through which the optical transceiver 280 is disposed when the optical transceiver 280 is installed into the mounting cage 240 and/or coupled to the printed circuit board 210. The side portions 249 include locking mechanisms 246 that engage locking mechanism 287 of the optical transceiver 280 to selectively maintain the optical transceiver 280 within the mounting cage 240.

Figure 7:
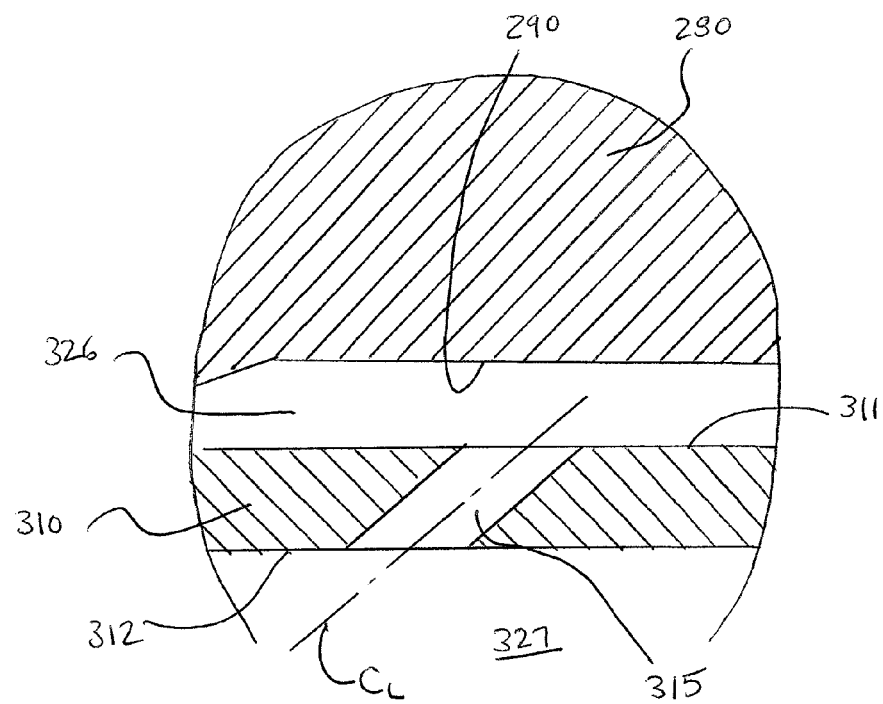
FIG. 7 is a portion of a printed circuit board according to an embodiment that defines a lumen non-normal to a surface of the printed circuit board.

Although the lumen 215 is shown and described as defining a center line $C_L$ that is substantially normal to the first surface 211 and/or the second surface 212 of the printed circuit board 210, in other embodiments, at least one lumen from the second set of lumens 215 can define a center line that is non-normal to the first surface 211 and/or the second surface 212 of the printed circuit board 210. For example, FIG. 7 is a cross-sectional view of a portion of a printed circuit board 310 according to an embodiment that defines at least one lumen 315. The lumen 315 extends between a first surface 311 and a second surface 312 of the printed circuit board 310, and defines a center line $C_L$. As shown in FIG. 7, the center line $C_L$ of the lumen 315 is non-normal to the first surface 311 and the second surface 312 of the printed circuit board 310. Similarly stated, the center line $C_L$ of the lumen 315 is angled (i.e., at an angle of between 0 and 90 degrees) relative to the printed circuit board 310. In this manner, the lumen 315 provides fluid communication between an internal volume 326 and an external volume 327 adjacent the second surface 312 such that the air flow into the internal volume 326 can have a direction associated with the angle of the lumen 315.

In some embodiments, the printed circuit board 310 can define a set of lumens including at least a first lumen defining a center line that defines a first angle relative to the first surface 311 of the printed circuit board 310 and at least a second lumen defining a center line that defines a second angle relative to the first surface 311 of the printed circuit board 310. For example, in some embodiments, the printed circuit board 310 can include a first set of lumens defining a center line offset from the first surface 311 of the printed circuit board 310 by a first angle (e.g., an angle of +30 degrees) and a second set of lumens defining a center line offset from the first surface 311 of the printed circuit board 310 by a second angle different than the first angle (e.g., an angle of −30 degrees). In such an embodiment, the first set of lumens can facilitate air flow into the internal volume 326 and the second set of lumens can facilitate air flow out of the internal volume 326.

Figure 8:
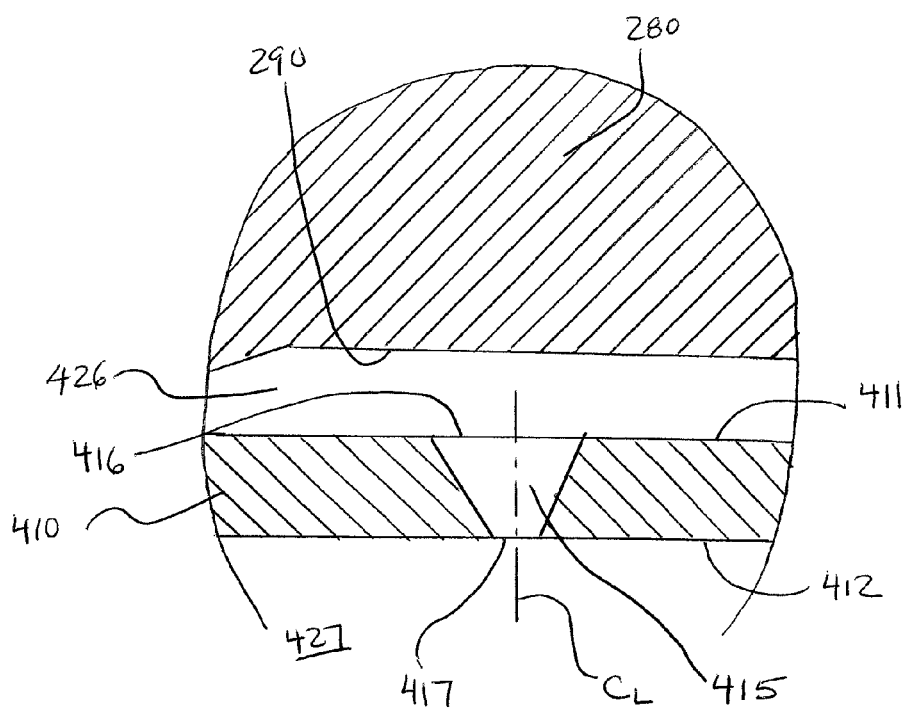
FIG. 8 is a portion of a printed circuit board according to an embodiment that defines a lumen having a varying cross-sectional size.

Although the lumen 215 is shown as having a substantially constant size along its center line $C_L$, in other embodiments, at least one lumen from the second set of lumens 215 can having size that varies spatially along its center line $C_L$. For example, FIG. 8 is a cross-sectional view of a portion of a printed circuit board 410 according to an embodiment that defines at least one lumen 415. The first surface 411 of the printed circuit board defines a first opening 416 in fluid communication with the lumen 415 and the second surface 412 of the printed circuit board 410 defines a second opening 417 in fluid communication with the lumen 415. The lumen 415 extends between the first opening 416 and the second opening 417, and defines a center line $C_L$. In this manner, the lumen 415 extends through the printed circuit board 410 between the second surface 412 and the first surface 411 to provide fluid communication between an internal volume 426 and an external volume 427 adjacent the second surface 412. Thus, in use, air (or any other suitable cooling fluid) can flow between the volume 427 adjacent the bottom side 412 of the printed circuit board 410 and the internal volume 426 via the lumen 415, as described above.

As shown in FIG. 8, the first opening 416 has a first size (e.g., diameter, bisecting diagonal, chord length or the like) and/or cross-sectional area and, the second opening 416 has a second size (e.g., diameter, bisecting diagonal, chord length or the like) and/or cross-sectional area different than the first size. Said another way, the size and/or cross-sectional area of the lumen 415 varies spatially along the center line $C_L$. In this manner, the size and/or area of the lumen 415 can be configured to produce an air flow having a desired flow characteristic into and/or out of the internal volume 426. For example, in some embodiments, the lumen 415 can have a substantially conical shape (e.g., a funnel-shaped lumen) such that a speed of the air flow entering the internal volume 426 is higher than a speed of the air flow within the external volume 427. Increasing the speed and/or velocity of the air flow within the internal volume 426 can, in certain instances, promote turbulent air flow, which can result in more efficient heat transfer than a corresponding laminar flow. In other embodiments, the size and/or shape of the lumen 415 can vary spatially to produce a rotational motion (e.g., a swirl) in the air flow entering the internal volume 426. In yet other embodiments, the size of the lumen 415 can be selected to provide a desired filtering performance for electromagnetic interference (EMI) noise.

Figure 9:
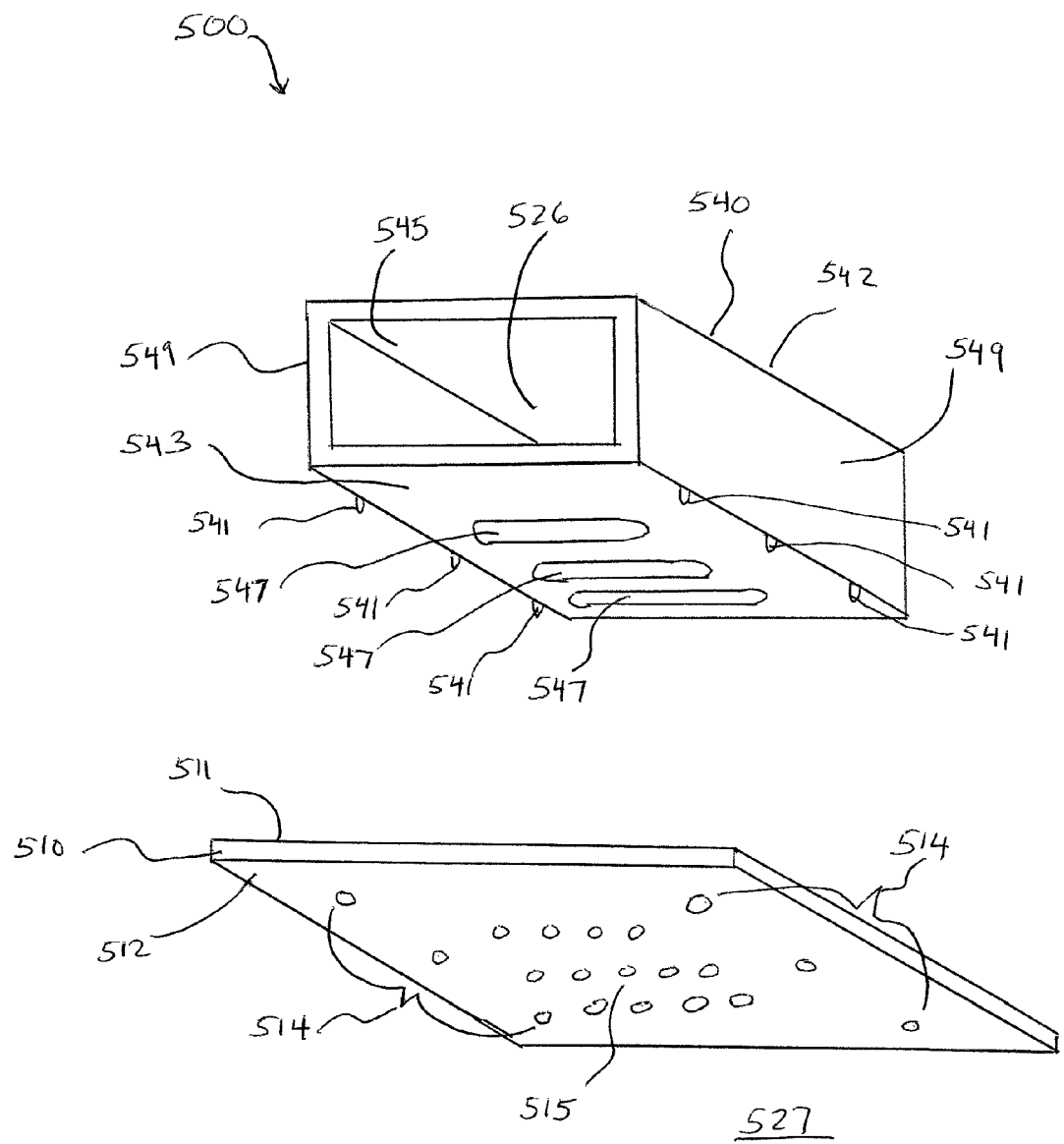
FIG. 9 is a perspective exploded view of a portion of a data processing unit according to an embodiment.

Although the mounting cage 240 is shown and described above as including a first (or top) side wall 242 and two side portions 249, in other embodiments, a mounting cage can include a second (or bottom) side wall substantially opposite the first side wall. For example, FIG. 9 is a perspective exploded view of a portion of a data processing unit 500 according to an embodiment that includes a printed circuit board 510 and a mounting cage 540. Similar to the portion of the data processing unit 200 shown and described above, the data processing unit 500 includes an optical transceiver (not shown in FIG. 9) that can be removably disposed within the mounting cage 540 and removably coupled to the printed circuit board 510.

The printed circuit board 510 includes a first (or top) surface 511 and a second (or bottom) surface 512. The printed circuit board 510 defines a first set of lumens 514 that is used to couple the mounting cage 540 to the printed circuit board 510, in a similar manner as described above. The printed circuit board 510 defines a second set of lumens 515 through which air can flow to improve the thermal performance of the optical transceiver (not shown in FIG. 9). The second set of lumens 515 can be of any suitable configuration, as described herein.

The mounting cage 540 includes a first (or top) side wall 542, a second (or bottom) side wall 543 and two side portions 549. The side portions 549 include a series of mounting protrusions 541, each of which can be disposed within a corresponding lumen 514 from the first set of lumens 514 to couple the mounting cage 540 to the printed circuit board 510. Similarly stated, when the mounting cage 540 is coupled to the printed circuit board 510, the first set of lumens 514 and the set of mounting protrusions 541 collectively limit the movement of the mounting cage 540 relative to the printed circuit board 510.

The mounting cage 540 defines an internal volume 526 within which at least a portion of the optical transceiver can be disposed. More particularly, the first side wall 542, the second side wall 543 and the two side portions 549 collectively define the internal volume 526 and an external volume 527 that is outside of the internal volume 526. The external volume 527 includes any volume external to the internal volume 526, including the volume outside of the internal volume 526 adjacent the second surface 512 of the printed circuit board 510, as identified in FIG. 9. Thus, when the mounting cage 540 is coupled to the printed circuit board 510, at least a portion of the optical transceiver can be disposed within the internal volume 526 and coupled to the printed circuit board 510.

The second surface 543 of the mounting cage 540 defines a set of cage openings 547 therethrough. When the mounting cage 540 is coupled to the printed circuit board 510, at least one of the cage openings 547 is at least partially overlapped with at least one lumen from the second set of lumens 515. In this manner, at least one cage opening 547 and at least one lumen from the second set of lumens 515 collectively provide fluid communication between the internal volume 526 and the external volume 527 adjacent the second surface 512. Thus, in use, air (or any other suitable cooling fluid) can flow from the bottom side 512 of the printed circuit board 510 into the internal volume 526 via the second set of lumens 515 and the cage openings 547.

Although the cage openings 547 are shown and described as having a shape and size that is different from the shape and size of the second set of lumens 515 defined by the printed circuit board 510, in other embodiments, the cage openings 547 can have a substantially similar shape and/or size as the second set of lumens 515. In some embodiments, the set of cage openings 547 can include the same number of openings as the second set of lumens 515 defined by the printed circuit board 510. In some such embodiments, each opening from the set of cage openings 547 can be substantially aligned with a corresponding lumen from the second set of lumens 515 when the mounting cage 540 is coupled to the printed circuit board 510.

Figure 10:
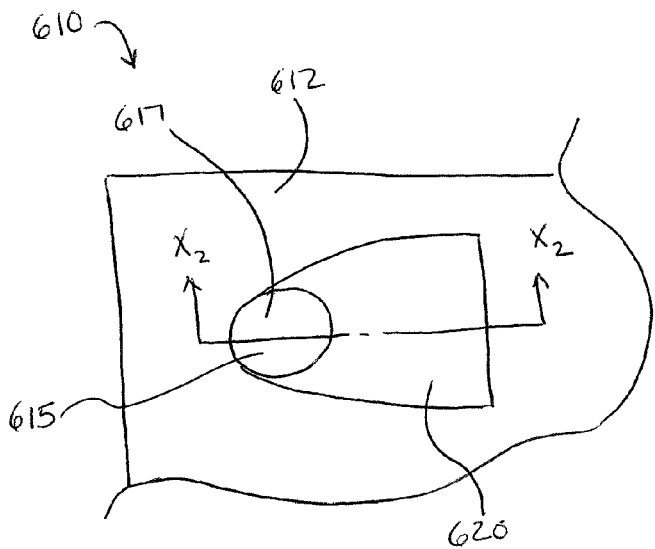
FIG. 10 is a bottom view of a portion of a printed circuit board according to an embodiment.
Figure 11:
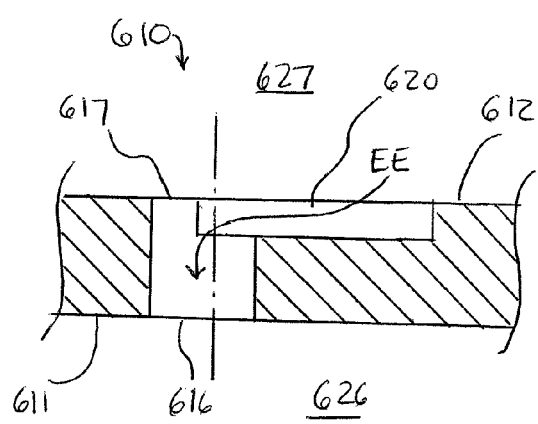
FIG. 11 is a cross-sectional view of the portion of the printed circuit board shown in FIG. 10 taken along line $X_2$-$X_2$ in FIG. 10.

FIGS. 10 and 11 show a portion of a printed circuit board 610 according to an embodiment. The printed circuit board 610 can be used in any suitable data processing unit of the types shown and described herein. For example, the printed circuit board 610 can be used in conjunction with any frame, mounting cage and/or electronic device of the types shown and described herein. The printed circuit board 610 includes a first surface 611 and a second surface 612. It should be noted that FIG. 10 shows a bottom view of the printed circuit board 610 to show the second surface 612, which is opposite the view shown of the printed circuit board 110 in FIG. 1 (which is a top view showing the first surface 111). In some embodiments, the first surface 611 of the printed circuit board 610 can define, at least in part, an internal volume 626 within which an electronic device can be disposed when coupled to the printed circuit board 610.

The printed circuit board 610 defines at least one air flow lumen 615 through which air can flow to improve the thermal performance of an electronic component (e.g., an optical transceiver) coupled to the printed circuit board 610. More particularly, the first surface 611 defines a first opening 616 in fluid communication with the lumen 615 and the second surface 612 defines a second opening 617 in fluid communication with the lumen 615. The lumen 615 extends between the first opening 616 and the second opening 617 to provide fluid communication between the internal volume 626 adjacent the first surface 611 and a volume 627 adjacent the second surface 612. Thus, in use, air (or any other suitable cooling fluid) can flow from the second side of the printed circuit board 610 (i.e., the portion of the external volume 627 adjacent the second surface 612) to the first side of the printed circuit board 610 via the air flow lumen 615, as shown by the arrow EE in FIG. 11.

The second surface 612 of the printed circuit board 610 also defines a recess 620 adjacent at least a portion of the second opening 617. Similarly stated, at least a portion of the second surface 612 surrounding the second opening 617 defines a recess 620. The recess 620 can function as an air flow channel, air flow path and/or air flow conduit through which air can be conveyed from the volume 627 into the lumen 615, as shown by the arrow EE in FIG. 11. Although the second surface 612 is shown and described as defining the recess 620 and the first surface 611 is described as defining, at least in part, the internal volume 626, in other embodiments, the first surface 611 can define a recess similar to the recess 620. In yet other embodiments, both the first surface 611 and the second surface 612 can define a recess.

Figure 12:
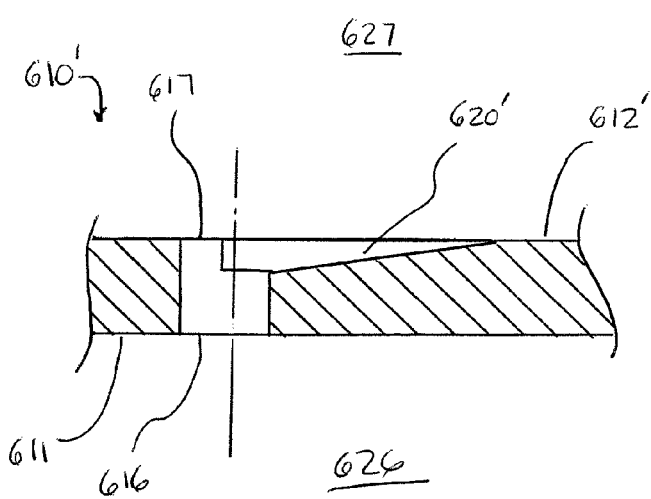
FIG. 12 is a cross-sectional view of a portion of a printed circuit board according to an embodiment.

In some embodiments, a portion of the second surface 612 that defines the recess 620 can be tapered. For example, FIG. 12 shows a cross-sectional view of a portion of a printed circuit board 610' that includes a second surface 612' that defines a tapered recess 620'. Similarly stated, a portion of the second surface 612' defines a tapered air flow channel through which air can be conveyed from the volume 627 into the lumen 615. In some embodiments, the shape and/or the depth of taper of the tapered recess 620' can vary spatially to produce a rotational motion (e.g., a swirl) in the air flow entering the lumen 615. For example, in some embodiments, the depth of the tapered recess 620' can vary in two dimensions within a plane defined by the second surface 612 of the printed circuit board 610'. Although the second surface 612' is shown and described as defining the tapered recess 620', in other embodiments, the first surface 611 can define a recess similar to the tapered recess 620'. In yet other embodiments, both the first surface 611 and the second surface 612' can define a tapered recess.

Figure 13:
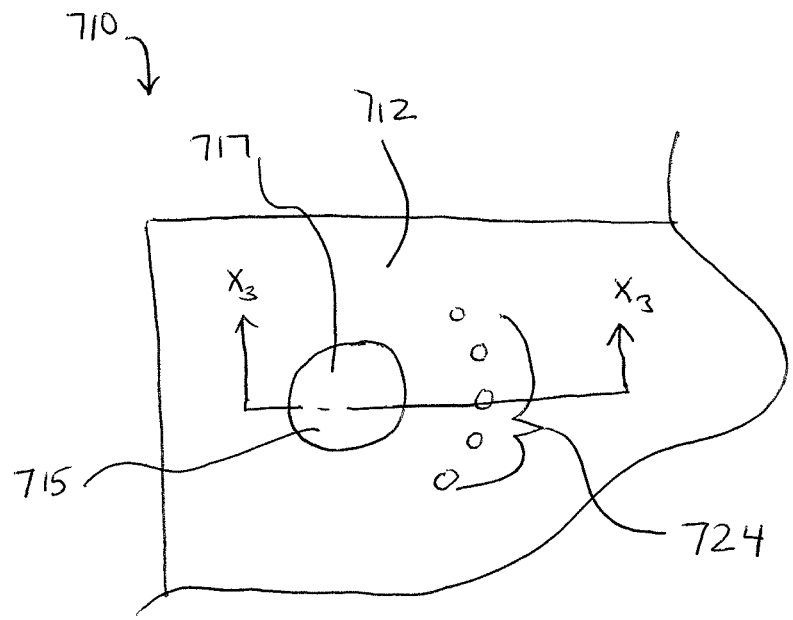
FIG. 13 is a bottom view of a portion of a printed circuit board according to an embodiment.
Figure 14:
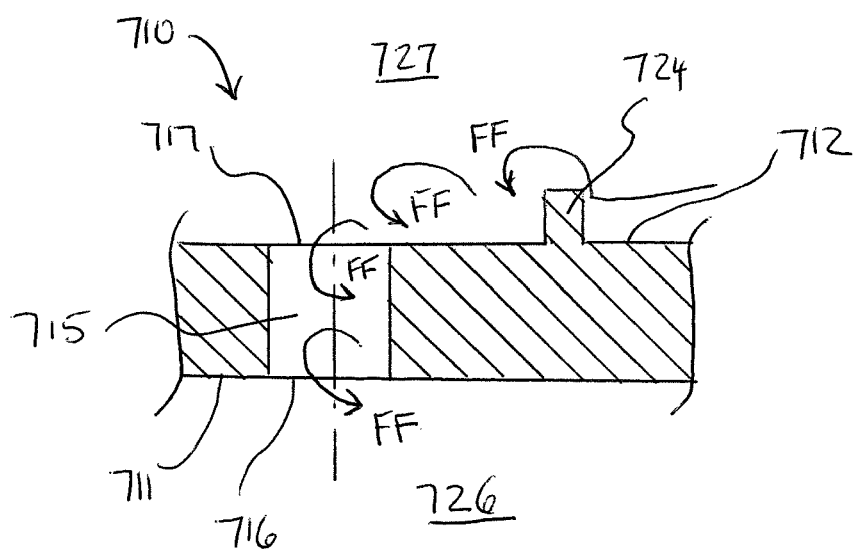
FIG. 14 is a cross-sectional view of the portion of the printed circuit board shown in FIG. 13 taken along line $X_3$-$X_3$ in FIG. 13.

FIGS. 13 and 14 show a portion of a printed circuit board 710 according to an embodiment. The printed circuit board 710 can be used in any suitable data processing unit of the types shown and described herein. For example, the printed circuit board 710 can be used in conjunction with any frame, mounting cage and/or electronic device of the types shown and described herein. The printed circuit board 710 includes a first surface 711 and a second surface 712. It should be noted that FIG. 13 shows a bottom view of the printed circuit board 710 to show the second surface 712, which is opposite the view shown of the printed circuit board 110 in FIG. 1 (which is a top view showing the first surface 111). In some embodiments, the first surface 711 of the printed circuit board 710 can define, at least in part, an internal volume 726 within which an electronic device can be disposed when coupled to the printed circuit board 710.

The printed circuit board 710 defines at least one air flow lumen 715 through which air can flow to improve the thermal performance of an electronic component (e.g., an optical transceiver) coupled to the printed circuit board 710. More particularly, the first surface 711 defines a first opening 716 in fluid communication with the lumen 715 and the second surface 712 defines a second opening 717 in fluid communication with the lumen 715. The lumen 715 extends between the first opening 716 and the second opening 717 to provide fluid communication between the internal volume 726 adjacent the first surface 711 and a volume 727 adjacent the second surface 712. Thus, in use, air (or any other suitable cooling fluid) can flow from the second side of the printed circuit board 710 (i.e., the portion of the external volume 727 adjacent the second surface 712) to the first side of the printed circuit board 710 via the air flow lumen 715.

The second surface 712 of the printed circuit board 710 includes a set of protrusions 724 adjacent the second opening 717. The protrusions 724 can produce turbulence and/or unsteady flow patterns in the air flow adjacent the second side 712 of the printed circuit board 710, as shown by the arrows FF in FIG. 13. Similarly stated, the protrusions 724 can define flow obstructions configured to guide and/or direct air flow from the second side of the printed circuit board 710 into the lumen 715. Although shown as including a set of protrusions 724, in other embodiments, the second surface 712 of the printed circuit board 710 can define a single protrusion.

The protrusions 724 can be of any suitable size and/or shape to produce the desired air flow pattern. Moreover, in some embodiments, the protrusions 724 can be integrally formed with the printed circuit board 710 (e.g., by etching). In other embodiments, the protrusions 724 can be produced separately from the printed circuit board 710 and then coupled or attached to the printed circuit board 710. In some embodiments, for example, the protrusions 724 can be pins that are press fit into corresponding openings defined by the second surface 712 of the printed circuit board 710.

Figure 15:
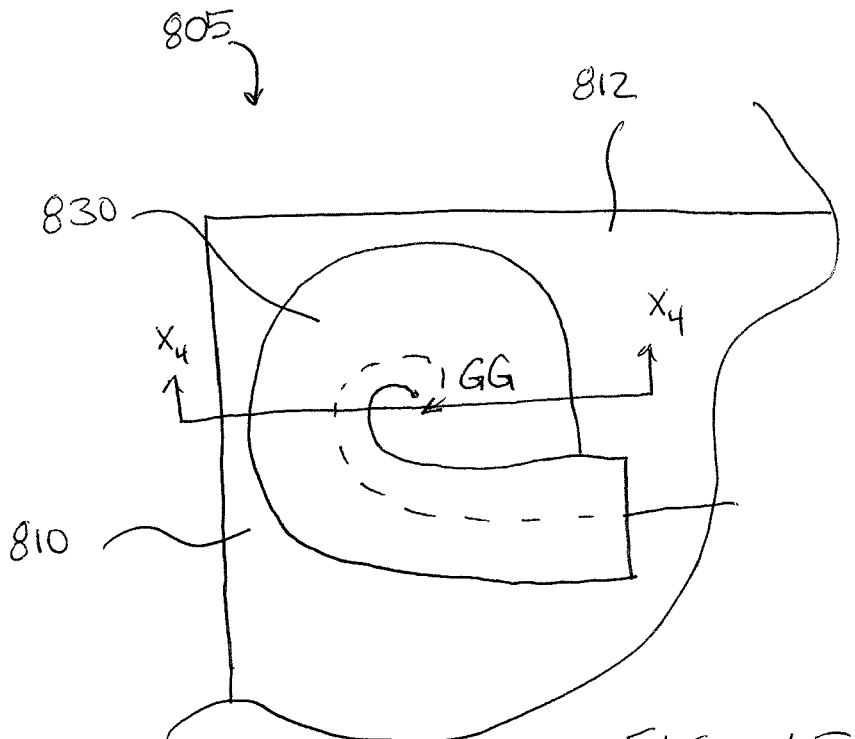
FIG. 15 is a bottom view of a portion of a printed circuit board assembly according to an embodiment.
Figure 16:
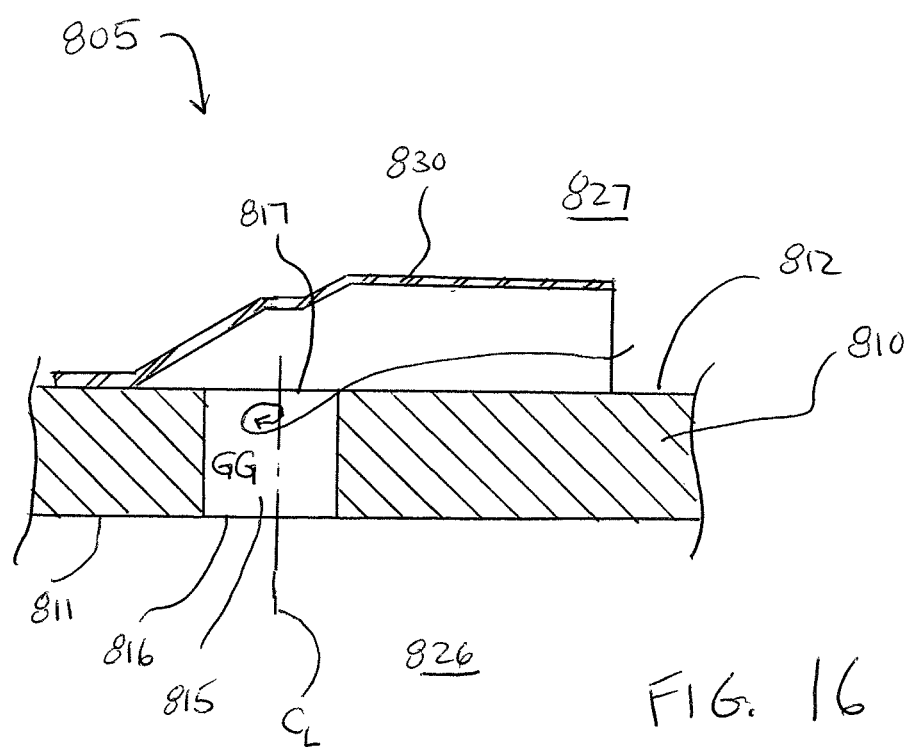
FIG. 16 is a cross-sectional view of the portion of the printed circuit board assembly shown in FIG. 15 taken along line $X_4$-$X_4$ in FIG. 15.

FIGS. 15 and 16 show a portion of a printed circuit board assembly 805 according to an embodiment. The printed circuit board assembly 805 can be used in any suitable data processing unit of the types shown and described herein. For example, the printed circuit board assembly 805 can be used in conjunction with any frame, mounting cage and/or electronic device of the types shown and described herein. The printed circuit board assembly 805 includes a printed circuit board 810 and a flow member 830. The printed circuit board 810, which can be similar to any of the printed circuit boards shown and described herein, includes a first surface 811 and a second surface 812. It should be noted that FIG. 15 shows a bottom view of the printed circuit board assembly 805 to show the second surface 812 and the flow member 830, which is opposite the view shown of the printed circuit board 110 in FIG. 1 (which is a top view showing the first surface 111). In some embodiments, the first surface 811 of the printed circuit board 810 can define, at least in part, an internal volume 826 within which an electronic device can be disposed when coupled to the printed circuit board 810.

The printed circuit board 810 defines at least one air flow lumen 815 through which air can flow to improve the thermal performance of an electronic component (e.g., an optical transceiver) coupled to the printed circuit board 810. More particularly, the first surface 811 defines a first opening 816 in fluid communication with the lumen 815, and the second surface 812 defines a second opening 817 in fluid communication with the lumen 815. The lumen 815 extends between the first opening 816 and the second opening 817 to provide fluid communication between the internal volume 826 adjacent the first surface 811 and a volume 827 adjacent the second surface 812. Thus, in use, air (or any other suitable cooling fluid) can flow from the second side of the printed circuit board 810 (i.e., the portion of the external volume 827 adjacent the second surface 812) to the first side of the printed circuit board 810 via the air flow lumen 815.

The flow member 830 is coupled to the second surface 812 of the printed circuit board 810 such that the flow member 830 and a portion of the second surface 812 collectively define a flow path 822 through which air can flow into and/or out of the lumen 815. The flow member 830 can have any suitable shape to produce a flow have the desired characteristics within the lumen 815. For example, in some embodiments, the flow member can be configured to produce a rotational motion (e.g., a swirl) in the air flow entering the lumen 815, as shown by the arrow GG in FIGS. 15 and 16. Similarly stated, in some embodiments, the flow member 830 can be configured to produce a rotational motion about the center line $C_L$ of the lumen 815. In such embodiments, the flow member 830 can include a side wall having a helical shape. In other embodiments, the flow member 830 can be configured to produce a rotational motion about an axis normal to the center line $C_L$ of the lumen 815 (i.e., a flow "tumble."

The flow member 830 can be coupled to the printed circuit board 810 using any suitable mechanism. For example, in some embodiments, the flow member 830 can be coupled to the printed circuit board 810 using an adhesive, a mechanical fastener or the like.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

For example, although the optical transceivers are described herein as being manufactured according to the SFP standard, in other embodiments, an optical transceiver assembly can include any optical transceiver manufactured according to any Multi-Source Agreement (MSA) standard, including, for example, the Quad Small Form factor Pluggable (QSFP) standard, the CXP standard, the XFP standard, or the like. In yet other embodiments, an optical transceiver assembly can include any optical transceiver, even if not manufactured according to an industry standard.

Although the air flow lumens are shown as having a substantially linear center line $C_L$ (see e.g., lumen 215), in other embodiments, a printed circuit board can define an air flow lumen having a non-linear center line $C_L$.

Although various embodiments have been described as having particular features and/or combinations of components, other embodiments are possible having a combination of any features and/or components from any of embodiments as discussed above. For example, in some embodiments, a printed circuit board assembly can include a printed circuit board having a second surface defining a recess (similar to the recess 620 shown and described with reference to FIGS. 10 and 11) and a flow member coupled to the second surface (similar to the flow member 830 shown and described with reference to FIGS. 15 and 16).

What is claimed is:

1. An apparatus, comprising:
a printed circuit board configured to be coupled to an electronic device, the printed circuit board defining a first plurality of lumens therethrough configured to receive a mounting portion of a frame, the frame and a portion of a first surface of the printed circuit board configured to define an internal volume within which at least a portion of the electronic device is disposed and an external volume,
the printed circuit board defining a second plurality of lumens positioned to place at least a portion of the external volume in fluid communication with the internal volume.

2. The apparatus of claim 1, wherein the electronic device is a pluggable optical transceiver and the frame is a transceiver cage.

3. The apparatus of claim 1, wherein each lumen from the second plurality of lumens is noncontiguous with each lumen from the first plurality of lumens.

4. The apparatus of claim 1, wherein a cross-sectional area of a lumen from the second plurality of lumens across a plane substantially normal to a center line of the lumen is substantially non-circular.

5. The apparatus of claim 1, wherein a center line of a lumen from the second plurality of lumens is non-normal to the first surface of the printed circuit board.

6. The apparatus of claim 1, wherein:
the first surface of the printed circuit board defines a first opening in fluid communication with a lumen from the second plurality of lumens; and
a second surface of the printed circuit board defines a second opening in fluid communication with the lumen from the second plurality of lumens, a cross-sectional area of the first opening is different than a cross-sectional area of the second opening.

7. The apparatus of claim 1, wherein:
a second surface of the printed circuit board opposite from the first surface defines an opening in fluid communication with a lumen from the second plurality of lumens, a portion of the second surface surrounding the opening defining a recess.

8. The apparatus of claim 1, wherein:
a second surface of the printed circuit board opposite from the first surface defines an opening in fluid communication with a lumen from the second plurality of lumens, a portion of the second surface surrounding the opening defining a tapered flow channel.

9. The apparatus of claim 1, wherein:
a second surface of the printed circuit board opposite from the first surface defines an opening in fluid communication with a lumen from the second plurality of lumens, a portion of the second surface surrounding the opening including at least one protrusion configured to impart turbulence to an air flow across the second surface of the printed circuit board.

10. The apparatus of claim 1, wherein the printed circuit board includes a second surface opposite from the first surface, the second surface defines an opening in fluid communication with a lumen from the second plurality of lumens, the apparatus further comprising:
a flow member coupled to the second surface of the printed circuit board, the flow member and a portion of the second surface surrounding the opening collectively defining a flow path into the lumen.

11. The apparatus of claim 1, further comprising:
the frame coupled to the printed circuit board such that the mounting portion of the frame is disposed within the first plurality of lumens and a side wall of the frame is disposed adjacent the first surface of the printed circuit board,
the side wall of the frame defining a plurality of frame openings, at least one frame opening from the plurality of frame openings is at least partially overlapped with at least one respective lumen from the second plurality of lumens defined by the printed circuit board.

12. An apparatus, comprising:
a printed circuit board configured to be coupled to an electronic device, the printed circuit board defining a first plurality of lumens therethrough and a second plurality of lumens therethrough between a first surface and a second surface opposite the first surface; and
a frame including a plurality of mounting protrusions and a side wall, the frame being coupled to the printed circuit board such that each mounting protrusion from the plurality of mounting protrusions is disposed within a lumen from the first plurality of lumens, a portion of the side wall of the frame and the first surface of the printed circuit board defining an internal volume within which at least a portion of the electronic device is disposed when the electronic device is coupled to the printed circuit board,
at least one lumen from the second plurality of lumens defined by the printed circuit board positioned such that an external volume adjacent the second surface of the printed board is in fluid communication with the internal volume.

13. The apparatus of claim 12, wherein a cross-sectional area of a lumen from the second plurality of lumens across a plane substantially normal to a center line of the lumen is substantially non-circular.

14. The apparatus of claim 12, wherein a center line of a lumen from the second plurality of lumens is non-normal to the first surface of the printed circuit board.

15. The apparatus of claim 12, wherein:
the first surface of the printed circuit board defines a first opening in fluid communication with a lumen from the second plurality of lumens; and
the second surface of the printed circuit board defines a second opening in fluid communication with the lumen from the second plurality of lumens, a cross-sectional area of the first opening is different than a cross-sectional area of the second opening.

16. The apparatus of claim 12, wherein:
the second surface of the printed circuit board defines an opening in fluid communication with a lumen from the second plurality of lumens, a portion of the second surface surrounding the opening configured to impart turbulence to an air flow across the second surface of the printed circuit board.

17. The apparatus of claim 12, wherein the second surface of the printed circuit board defines an opening in fluid communication with a lumen from the second plurality of lumens, the apparatus further comprising:

a flow member coupled to the second surface of the printed circuit board, the flow member and a portion of the second surface surrounding the opening collectively defining a flow path into the lumen.

* * * * *